United States Patent [19]
Laijoki-Puska

[11] Patent Number: 5,407,392
[45] Date of Patent: Apr. 18, 1995

[54] WINTER SCENE ROOM OR SPACE STUDY

[76] Inventor: Ritva Laijoki-Puska, Visamäki 5 E, 02130 Espoo, Finland

[21] Appl. No.: 768,204

[22] PCT Filed: Apr. 9, 1990

[86] PCT No.: PCT/FI90/00096
§ 371 Date: Oct. 24, 1991
§ 102(e) Date: Oct. 24, 1991

[87] PCT Pub. No.: WO90/12937
PCT Pub. Date: Nov. 1, 1990

[30] Foreign Application Priority Data

Apr. 25, 1989 [FI]  Finland ................................ 891949

[51] Int. Cl.⁶ .............................................. A63C 19/10
[52] U.S. Cl. ...................................... 472/65; 472/57; 472/90
[58] Field of Search ............................ 472/57, 65, 90

[56] References Cited

U.S. PATENT DOCUMENTS 4,790,531  12/1988  Matsui et al. ................... 472/90
5,156,333  10/1992  Worsfold ........................ 472/65 X

FOREIGN PATENT DOCUMENTS 0246179  11/1987  European Pat. Off. .
61-48389  3/1986  Japan .

*Primary Examiner*—Carl D. Friedman
*Assistant Examiner*—Christopher Todd Kent

[57] ABSTRACT

A winter scene space study uses a space separated from the surroundings by transparent walls. The space is provided with refrigerator equipment as well as with equipment for producing water vapor and water jets or running water in the space. Temperature of the space is controlled or set in a manner that water vapor crystallizes into snow crystals and/or frost or water jets or running water at least freeze. By arranging the temperature to fluctuate on either side of 0° C., the ice, frost and/or snow crystals can be alternately melted and re-formed. By adjusting temperature and the amount of water vapor properly, it is possible to create snowfall in the space.

8 Claims, 1 Drawing Sheet

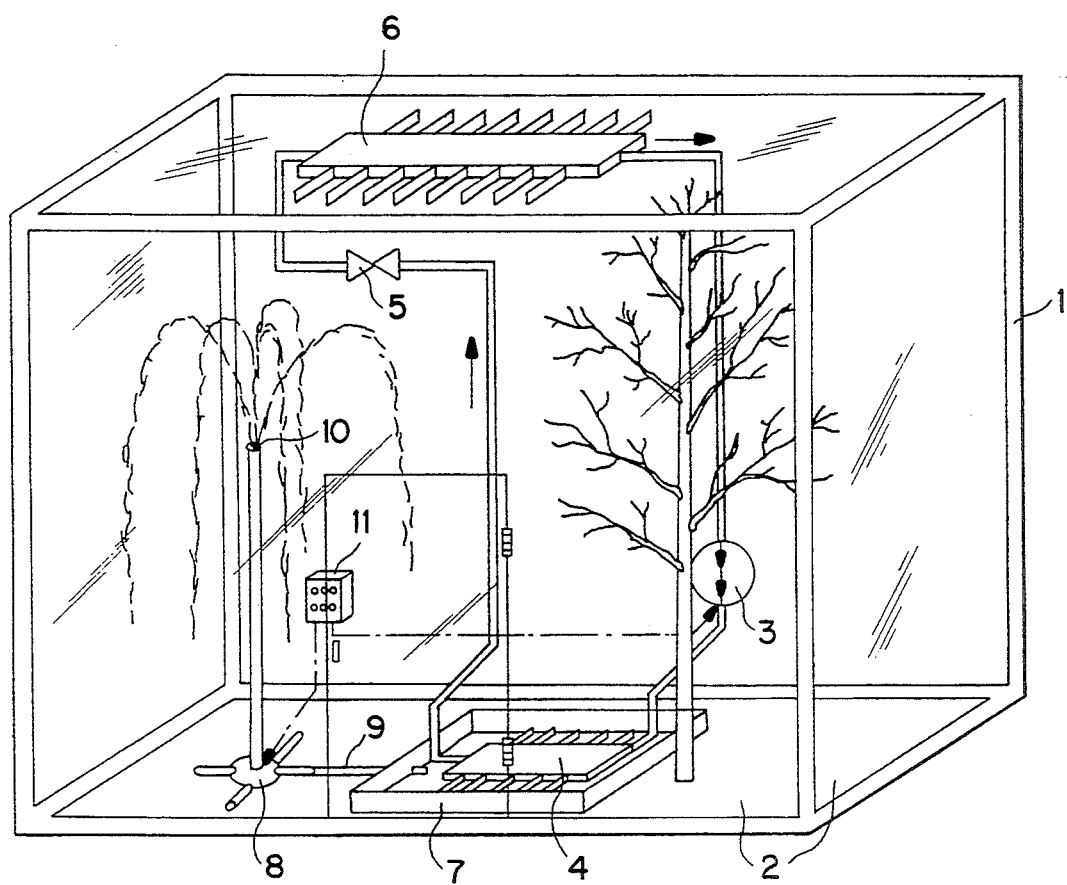

WINTER SCENE ROOM OR SPACE STUDY

The present invention relates to a winter scene room or a space study, which in a compact embodiment can be used as a piece of decor kept on top of a table or a cabinet and in a larger-size embodiment it can be used as a winter garden room for just spending time, walking in snow or even for winter-time swimming.

According to the invention, it has been realized that particularly interesting and beautiful visual effects can be created by refrigerating water vapor, water jets or running water in a closed space in a manner that water vapor crystallizes into snow crystals and/or frost or that running water freezes at least partially.

According to a preferred embodiment of the invention, temperature is adapted to alternately rise and fall on either side of 0° C. to effect melting and re-freezing, frosting and/or crystallizing of ice, frost and/or snow crystals. Observing such a dynamic process is both interesting and educational while watching the space study also offers aesthetic pleasure. A space study of the invention is particularly suitable for use in the lobbies and hallways of public buildings and in various waiting rooms. While the watching of a space study entertains people, such a space study can be used for refrigerating the ambient space. Especially in hot-climate countries, there is thus a significant utility for the space study also as a refrigerating unit. The need for cooling public facilities exists also in Nordic countries in summertime.

In a preferred embodiment of the invention, the temperature and the amount of water vapor in the space is adjusted for creating snowfall in the space. Thus, the floor of the space can be covered with snow.

One embodiment of the invention will now be described in more detail with reference made to the accompanying drawing, which is a perspective and partially schematic view of a space study according to one embodiment of the invention.

The drawing illustrates an embodiment which is only intended for showing a technical application of the invention. In practice, the design of a space study can be freely selected and the same is true with the interior decoration of the space by using various elements, which add to the visual experiences of a person viewing the study.

In the case shown in the drawing, the space of a space study is separated from the surrounding room by transparent walls 2 supported on a framework 1. The framework 1 can be made of metal tubes or metal profiles. The walls 2 can be made of sheets of glass or plexiglass. If necessary the walls 2 can be multi-layered for improved heat insulation.

Refrigeration of the space is effected by means of a conventional refrigerator unit, wherein refrigeration is based on the vaporization of a liquid and the adiabatic expansion of a gas. The pressure of a coolant circulating in a closed coolant pipework is raised by means of a compressor 3 (or by heating). The heated coolant is cooled in a condenser 4, wherein the coolant condensates into a liquid forced through an evaporating valve 5 to an evaporator 6, wherein the expanded coolant turns into vapor or gas and binds heat from its environment.

The condenser 4 is placed in a water basin 7 for evaporating water vapor therefrom. The rising water vapor cools and crystallizes into snow crystals as well as frosts on the surfaces of elements positioned in the space. The dried plants, bushes or trees located in the space thus receive a decorative coating. Producing water vapor from basin 7 by means of condenser 4 included in a refrigerator unit is particularly preferred, since the refrigerator unit thus becomes effective and the energy spent for cooling can be utilized for producing water vapor which is needed for creating frost and snow crystal effects in the space.

In case of a more effective cooling (condenser 4 heating vigorously) too much vapor could form in the space. This can be prevented by placing on top of basin 7 a vapor-collector hood (not shown) for passing vapor outside the space, e.g. for the humidification of ambient air. The basin 7 can be replenished with fresh water from outside. Thus, the heat bound by water upon the vaporization thereof will be transferred out of the space for an effective and rapid refrigeration thereof.

In the present case, the space is provided with a water jet device whose stand 8 is fitted with a pump for discharging water jets from a nozzle head 10. Water can be acquired from basin 7 by way of a pipe 9. If the space temperature is tens of degrees below freezing, the water jets are capable of freezing in mid-air or they can be formed as ice cones on the floor of the space. Alternatively, it is possible to employ any form of running water and to adjust temperature in a manner that water freezes at least partially in the course of its running and thus forms ever-changing works of art.

Every once in a while, the space temperature can be raised above 0° C. for deicing and desnowing the space, so that another creation of a winter scene can be initiated at the next refrigeration step.

Outside the space is mounted a control panel 11 for controlling the rise and fall of temperature in the space or the spraying or vaporizing effect of water.

Additional special effects can be created by illuminating the space with colored lights, the color combinations being selectively variable. The light beams can be slowly or rapidly moving, enhancing or dimming. By using a combination of a suitable amount of vapor and temperature for generating fog in the space, a variety of visual effects can be created by means of, especially by moving colored lights.

The interior decorating elements of the space may comprise various surface materials in which water vapor condensates in a variety of ways for thus producing decorative frost and ice crystal surfaces.

A space study of the invention is also suitable for use as a winter-swimming spot to be built in connection with health spas and indoor swimming pools. In this case, a basin 7 is made sufficiently deep and large for a dip in cold water and it can be surrounded by snow. If basin 7 is furnished with a condenser which heats the water of basin 7 too warm for a cold-water dip, it is possible to build another, chilled-water basin adjacent thereto. Thus, it is possible to take a dip in either one of the basins or alternately in each.

A compact, portable space study to be kept on top of a table or a cabinet can be adapted to be refrigerated directly by electric power. In Peltier effect, for example, the cooling effect is created as electric current travels along the junction of two materials.

It is also possible to reflect onto a wall behind the space wall a three-dimensional hologram image which can be made active or living by what is happening inside the space study. The hologram image can be made variable automatically or by manual control for finding an image matching the events in the space study.

A winter scene room of the invention need not be necessarily provided with transparent walls when it is used as a cold relaxation room built in connection with a sauna or a health spa. In this case, the room is provided with a refrigerator unit 3–6 and a device 4, 7 for generating vapor in the room space which is refrigerated below 0° C. for producing and maintaining snow and/or frost. This type of cold relaxation room is preferably provided with a water basin serving as an opening for a cold-water dip. It is known to build cold-water tanks in connection with saunas but such tanks or basins have not previously been built in a winter scene room.

When the space is provided with transparent walls 2, such walls can be kept clear of frost e.g. by means of air flows which is why a frame pipe 1 can be provided with orifices for blowing air jets along the internal surfaces of wall panels 2. In any case, air flows can be produced in the space by means of fans.

It is obvious that the invention is not limited to the above embodiment but various modifications and combinations of details thereof are possible within the scope of the annexed claims.

What is claimed is:

1. A winter space comprising walls for separating the space form ambient environment, refrigerator equipment and water handling equipment, the water handling equipment producing at least one of water vapor, water jets and running water in the space, temperature of the space being coolable below 0° C. by the refrigerator equipment for producing and maintaining snow and frost, the winter space further comprising control means operatively connected to the refrigerator equipment for alternately raising and lowering the temperature of the space above and below 0° C. to thereby affect melting and refreezing, frost and crystallizing of ice, frost and snow crystals within the space, at least one of the walls of the space being transparent for permitting outside viewing of dynamic melting and refreezing processes within the space, the winter space further comprising means for creating air flows to keep the at least one transparent wall free of frost and the at least one transparent wall being connected to a frame pipe, the frame pipe connecting two of the walls, the means for creating air flows comprises orifices provided in the frame pipe, air jets being blown from the orifices along internal surfaces of the transparent wall.

2. The winter space as set forth in claim 1, further comprising means for producing light effects within the space.

3. The winter space as set forth in claim 1, further comprising dried plants within the space.

4. The winter space as set forth in claim 1, wherein the water handling equipment includes a water basin located within the space, water being evaporatable within the space from the water basin.

5. The winter space as set forth in claim 4, wherein the refrigerator equipment comprises a condenser in the water basin, an evaporator located exteriorly to the space and pipes for connecting the condenser and the evaporator.

6. The winter space as set forth in claim 1, wherein the water handling equipment further comprises a water jet operatively connected to the water basin, water being emitted from the water jet and the temperature within the space alternatively freezing the water to form ice and then melting the ice.

7. A winter scene room or a space study comprising:
   walls separating a space from a surrounding environment, the walls including a plurality of walls which are transparent whereby the winter scene room or space study can be viewed from the surrounding environment, each adjacent transparent wall being connected to a frame pipe;
   water handling equipment, the water handling equipment producing at least one of water vapor, water jets, and running water in the space, the water handling equipment comprises a water basin located within the space, water being evaporatable within the space from the water basin;
   refrigerator equipment for controlling space temperature within the winter scene room or space study, the refrigerator equipment cooling and elevating the space temperature below and above 0° C. to alternately raise and lower the space temperature, when the space temperature is below 0° C., ice, frost and snow crystals being produced and maintained and when the space temperature is above 0° C., the ice, frost and snow crystals melt such that alternate raising and lowering of the space temperature by the refrigerator equipment effects melting and refreezing, frosting and crystallizing of the ice, frost and snow crystals within the space, at least some of the ice, frost and snow crystals being made from the water evaporated from the water basin of the water handling equipment,
   a condenser and an evaporator being provided as a part of the refrigerator equipment, the condenser being located in the water basin and the evaporator being located exteriorly of the spaced, pipes being provided to connect the condenser and the evaporator;
   lighting means for producing light effects within the space;
   a water jet being provided as a part of the water handling equipment, the water jet being operatively connected to the water basin, water being emitted from the water jet and the water alternatively freezing to form ice and then melting as the temperature of the space is alternately raised and lowered; and
   means for creating air flows to keep at least one transparent wall free of frost, the means for creating air flows includes orifices provided in at least one of the frame pipes, air jets being blown from the orifices along internal surfaces of the at least one transparent wall adjacent to the frame pipe with the orifices.

8. The winter scene room or space study as set forth in claim 7, further comprising dried plants within the space.

* * * * *